United States Patent [19]

Porsche et al.

[11] 3,953,068
[45] Apr. 27, 1976

[54] SAFETY PASSENGER SEAT APPARATUS

[75] Inventors: Ferdinand Alexander Porsche, Doeffingen; Werner Scholpp, Stuttgart-Weilimdorf, both of Germany

[73] Assignee: Porsche Design, Germany

[22] Filed: Feb. 15, 1974

[21] Appl. No.: 443,142

[30] Foreign Application Priority Data
Feb. 15, 1973  Germany............................ 2307366

[52] U.S. Cl............................... 297/216; 297/254
[51] Int. Cl.²........................................... A47C 1/08
[58] Field of Search ........... 297/216, 250, 253, 254; 296/65 A

[56] References Cited
UNITED STATES PATENTS

| | | | |
|---|---|---|---|
| 2,725,921 | 12/1955 | Markin | 297/216 |
| 3,730,586 | 5/1973 | Eggert | 297/216 |
| 3,832,002 | 8/1974 | Eggert et al. | 297/216 |

Primary Examiner—James C. Mitchell
Attorney, Agent, or Firm—Craig and Antonelli

[57] ABSTRACT

Safety passenger seat apparatus for a vehicle including a passenger seat having a backrest pivotally attached to a seat rest. Energy absorption devices are provided for dissipating and absorbing collison and/or deceleration forces acting on the seat or a passenger in the seat, which energy absorption devices utilize both pivotal and linear movement of portions of the seat during the energy absorption. In one preferred embodiment, a rotation energy transformer is provided at the pivotal connection between the backrest and the seat rest, while a further rotation energy transformer is provided at the attachment of the seat rest to a fixed foot support structure. This preferred embodiment further includes a linear energy transformer which frictionally dissipates energy during linear movement of the foot and attached seat along guide rails fixed in the floor of the vehicle. The energy absorption characteristics of the absorbing transformers are different so as to accommodate a predetermined desired series of relative movements of the seat parts in the event of a collision. In another preferred embodiment, a child's seat is constructed with a pull member attached to the backrest and passed over a pulley attached to the seat rest, which pull member is than connected to a linear energy transformer. In the child's seat embodiment, both pivotal movement of the backrest with respect to the seat rest and linear movement of the seat are obtained.

17 Claims, 3 Drawing Figures

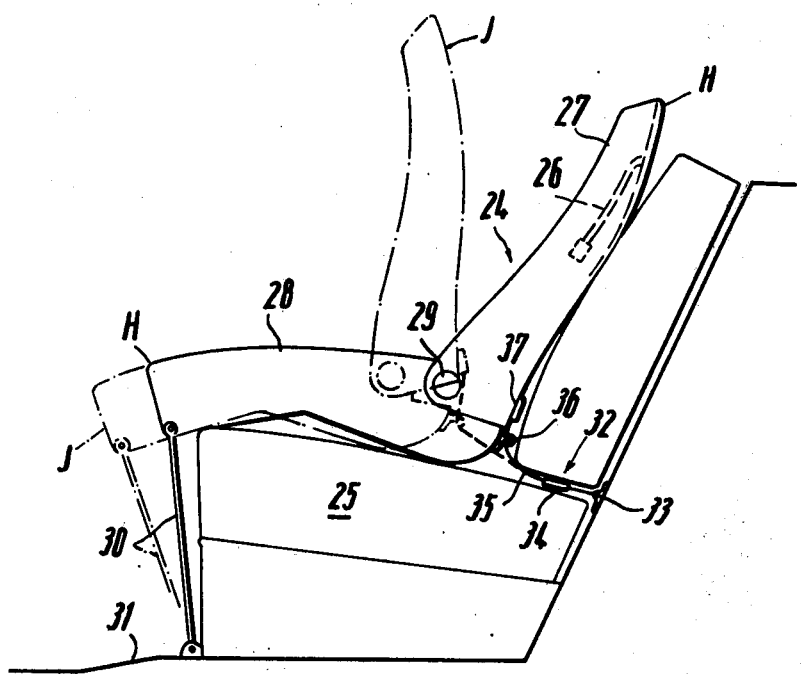

SAFETY PASSENGER SEAT APPARATUS

BACKGROUND AND SUMMARY OF THE INVENTION

The present invention relates to safety seat apparatus for vehicles, especially for passenger motor vehicles, preferably of the type having a passenger restraining belt system for holding a passenger in position in a seat. More particularly, the present invention is related to energy asorption devices which are attached to the seat in such a manner as to absorb collision or deceleration forces acting on the seat, in response to movement of the seat. That is, the energy absorption devices operate to dissipate energy upon movement of one part with respect to the other.

A seat arrangement has been contemplated (DT-OS 1 812 785) in which a backrest portion is pivotal with respect to a seat rest portion under interposition of an energy absorbing element. However, this arrangement has the disadvantage that during the energy absorption, only the backrest portion executes a relative movement in relation to the vehicle body structure. In serious accidents with corresponding high decelerations, the energy absorption related to movement of the backrest portion is often insufficient to protect a person occupying the seat. Further, with this type of arrangement, the backrest itself exhibits a pivotal movement about the point of rotation provided on the attachment thereof with the seat rest portion. That is, since the energy dissipation is only by way of the pivotal movement of the backrest portion, a large pivotal movement thereof is necessary to accommodate dissipation of energy. As a consequence of the extensive movement of the backrest, a highly harmful loading of the human organisms, especially in the head area, takes place during collisions with such apparatus.

The present invention contemplates an improved seat apparatus which avoids the above-mentioned disadvantages. More particularly, the present invention comtemplates constructing seating apparatus in such a way that energy absorption devices operate to dissipate energy in response to movement of the backrest portion as well as to dissipate energy in response to movement of the seat portion, which movements are in relation to the body structure of the vehicle.

In preferred embodiments contemplated by the present invention, a number of separate energy transformers are provided which operationally cooperate with the backrest portion and with the seat portion. Also according to preferred embodiments of the invention, the energy transformers are designed to be effective in two opposite working directions so that collision forces in opposite directions can be adequately absorbed and dissipated.

Also according to preferred embodiments contemplated by the invention, different energy absorption characteristics are provided for the differently positioned energy transformers so as to accommodate a predetermined control of the relative movements of the backrest with respect to the seat rest and the entire seat structure with respect to fixed vehicle support structure.

In one particularly preferred embodiment of the invention, a rotation energy transformer is provided for dissipating energy during pivotal movement of the backrest with respect to the seat rest and a further rotation energy transformer is provided at the connection of the seat rest with the fixed support structure. In addition, this preferred embodiment includes a linear energy transformer interconnected between the fixed support structure and a foot structure which supports the rotation energy transformer of the seat portion. The axis of rotation of the rotation energy transformer interconnecting the foot and the seat rest portion extends essentially midway between the front and rear boundary of the seat rest portion while the axis of rotation of the rotation energy transformer of the backrest extends at a position relative to the seat rest at a level corresponding to the hip joint area of a human passenger occupying the seat. In this connection, it will be understood that the position of this last-mentioned axis of rotation can be determined for an average human body shape for a range of sizes of passengers which are to use the seat. That is, if the seat is to be utilized as a children's seat, the spacing of the axis from the seat portion would understandably be smaller than would be the case for a seat which was to be utilized primarily for adults. The linear energy transformer of the seat rest portion is arranged between the foot and a vehicle floor portion for accommodating dissipation of energy due to linear sliding of the foot and attached seat with respect to the vehicle floor.

Another preferred embodiment of the invention is constructed as a child's seat which is placed on an existing adult passenger seat. In this embodiment, an energy transformer is provided in the area facing the adult seat, which energy transformer is connected by way of a pull member, such as a cord, wire, or the like, in such a way that relative movement of the parts of the child's seat are dissipated by the energy transformer due to movement of the pull member. In this preferred embodiment, the child's seat is constructed to have a backrest pivotal with respect to the seat rest and with the pull member of the energy transformer connected to the back and seat rest so as to effect a dissipation of energy with a pivotal movement of the backrest and a linear sliding movement of the seat rest along the adult seat. The pull member connected to the energy transformer engages the seat rest by way of a direction reversing device and is fastened to the backrest. A swingable or pivotable support member is provided in the front area of the seat rest for guiding movement of the seat rest along the adult seat.

A primary advantage of the above-mentioned arrangements of the present invention is that, through the construction of the energy absorption devices so as to dissipate energy with movement of both the backrest and the seat portion, sufficient travel for the dissipation of energy is available, even in cases with high decelerations acting on the vehicle. Further, since a plurality of energy transformers are provided, which energy transformers are arranged for dissipating energy by relative movement of different parts with respect to the fixed support structure, these energy transformers can be constructed very simply and reliably. By providing different energy absorption characteristics for the different energy transformers, the energy dissipation and relative movement of the backrest and seat rest can be arranged to minimize passenger injuries with a maximum of total energy dissipation. That is, by appropriately designing the rotation energy transformer at the backrest as having an energy dissipation characteristic which is a percentage or multiple of the energy dissipation characteristic of the rotation energy transformer at the seat rest, an appropriate rotation of both the backrest and seat rest can be obtained which minimizes injuries to the passengers. The provision of both rotation and linear energy transformers is advantageous in that the total space available for the energy absorption is well utilized. The above-mentioned preferred children's seat embodiment is advantageous in that a single energy transformer is required for accommodating both swiveling and linear movement of the parts of the seat. Since the energy transformer in this children's seat embodiment is connectible to the seat by way of a pull member, simple replaceability and exchangeability of the children's seat may be accomplished by merely disconnecting the pull member from the child's seat.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 3 is a partial side view of a rear passenger compartment including another preferred embodiment of safety seating apparatus according to the present invention, particularly for use for children.

DETAILED DESCRIPTION OF THE DRAWINGS

Figure 1:
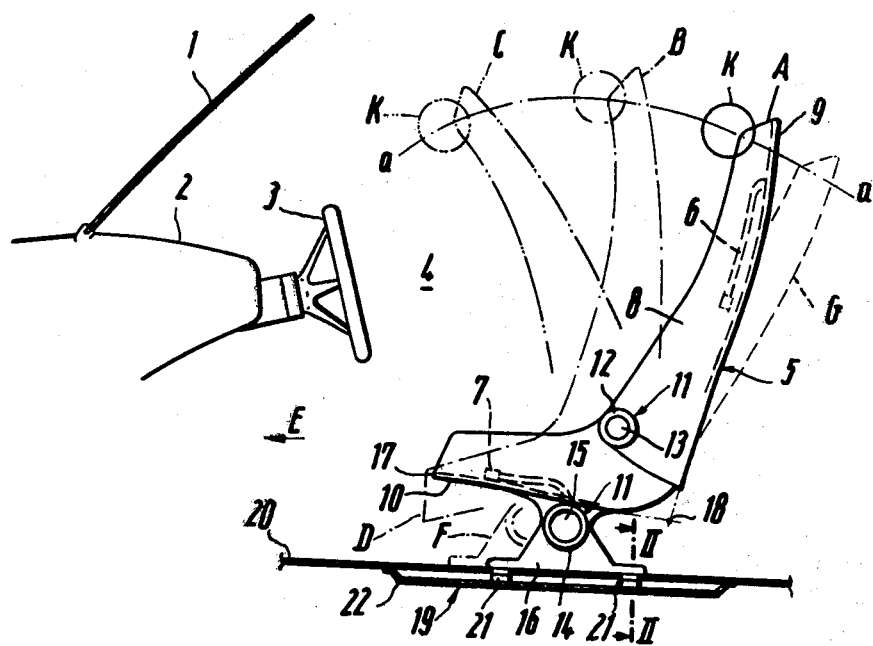
FIG. 1 is a partial side view of a passenger compartment of a passenger motor vehicle which includes safety seating apparatus in accordance with a preferred embodiment of the present invention.

The passenger motor vehicle schematically illustrated in FIG. 1 includes a windshield 1, a gauge board 2 and a steering wheel 3. A safety seat 5 is arranged inside the passenger compartment (for clarity of illustration of the details of the present invention, the remainder of the vehicle is not illustrated, since such can be of conventional construction).

Seat 5 is constructed as a bucket seat which is provided with a passenger restraining belt system which consists of a belt 6 and a belt 7. Belt 6 is fastened on a backrest portion 8 which is provided with an attached neck support 9. Belt 6 is assigned to backrest 8 and 7 is assigned to seat rest portion 10. The belts 6 and 7 are appropriately designed as a shoulder and lap belt system. Since the details of such belt systems will be readily apparent to one skilled in the art, given the present disclosure, they are not further described herein.

Reference numeral 11 is used in FIG. 1 to depict energy absorption devices which, during high deceleration forces experienced by the seat, for example during an accident, absorb energy in conjunction with movement of the backrest portion 8 and the seat rest portion 10. These devices 11 are formed as a number of energy transformers which are operative to dissipate forces in response to relative rotation of members and/or in response to relative linear displacement of members. Each of these energy transformers is designed to be effective in two opposite working directions, that is, in the direction of driving and in a direction opposite the direction of driving (see position G of the backrest portion 8).

One or more rotation energy transformers 12 are provided between backrest portion 8 and seat rest portion 10 for dissipating energy during pivotal movement of backrest portion 8 with respect to seat rest portion 10 about axis of rotation 13 of the rotation energy transformer 12 extending transverse to the vehicle driving direction (transverse to the plane of the FIG. 1 illustration) and at a position corresponding to the position of the hip joint point of a person (not illustrated in detail) occupying the seat. That is, when a person of the size for which the seat has been designed is sitting in the seat, the axis of rotation 13 will extend in alignment with the person's hip joint point so that rotation of the backrest portion 8 about the axis of rotation 13 is advantageously accompanied by rotation of the passenger about the hip joint point so as to minimize distortions of the passenger's back due to movement of the backrest portion.

A further rotation energy transformer 14 having an axis of rotation 15 is provided between the seat rest portion 10 and a foot 16, which foot 16 supports the seat 5 at the vehicle support structure. The axis of rotation 15 extends approximately midway between a front boundary 17 and a rear boundary 18 (shown in auxiliary lines) of the seat structure.

Figure 2:
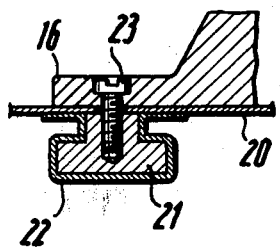
FIG. 2 is a cross-sectional view taken along line II—II of FIG. 1, which shows a feature of an enlarged scale.

The seat rest portion 10 is also connected with a linear energy transformer 19. This energy transformer 19 is provided on the floor 20 of the passenger motor vehicle and is constructed with a number of slide elements 21 engageable in a guide rail 22 (see FIG. 2). The slide elements 21 are fastened at the foot 16 by means of screws 23 and are held in position under tension in the guide rail 22.

In the event of a predetermined high deceleration acting on the vehicle, the backrest portion 8 is first swung out of position A into position B with the rotation energy transformer 12 absorbing energy during this movement of the backrest 8. If the movement from position A to position B of backrest 8 is insufficient to dissipate the deceleration forces experienced, the seat rest 10 and the backrest 8 are swung together into the position C and D, with rotation energy transformer 14 dissipating energy forces during this last-mentioned pivotal movement of the seat and backrest 10 and 8. The energy transformers 12 and 14 are designed with different energy absorption characteristics so as to result in the above-mentioned sequence of movements.

The linear energy transformer 19 absorbs energy with movement of the entire seat assembly in the direction of driving E so that the foot 16 attains position F. This linear energy transformer 19 is preferably constructed so that it is effective also during the deceleration phases with the above-described energy dissipation at the rotation energy transformers 12 and 14. Appropriate limit stops are provided such that the head portion K of the passenger moves in a curved sector a—a which lies within the tolerable range of the human body.

In the preferred embodiment illustrated in FIG. 3, a child's seat 24 is placed on top of a rear adult-sized seat 25. The child's seat 24 includes a belt system 26, a backrest 27 and a seat rest 28. The backrest 27 is constructed for pivotal motion through device 29. At the front area of the seat rest 28, a support member 30 is provided. This support member 30 is arranged pivoted at the floor 31 and at the seat rest so as to accommodate guiding and controlling of movement of the child's seat rest 28 from position H to position J.

For absorbing the energy in this arrangement of FIG. 3, an energy transformer 32 is connected in an area facing the seat 25. This energy transformer 32 is attached to the fixed support structure at 33 and is provided with a transformer unit 34 and a pull member 35. The pull member 35 is passed through a change-in-direction device 36 (pulley 36) attached to the seat portion 28 and is held or fastened at the backrest portion 27 by means of a fastening member 37. It will be understood that, with this particular connection of the pull member 35 at the seat rest and backrest, the back rest 27 can execute a swiveling or pivotal motion about device 29 and the seat portion 28 can execute a linear movement sliding along the surfaces of seat 25.

In the event of a predetermined high deceleration acting on the embodiment of FIG. 3, the energy transformer 32 effectively dissipates energy as the entire child's seat is moved from the position H to the position J with a relative pivoting of the backrest with respect to the seat rest, as well as with the linear movement of the entire children's seat. By means of the relative low positioning of the attachment point 33, a lifting of the child's seat from the seat 25 is counteracted.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A safety passenger seat apparatus for a vehicle of the type having relatively fixed support structure, said apparatus comprising:
   a passenger seat having a seat rest portion moveable substantially linearly with respect to said support structure and a back rest portion pivotally moveable with respect to said seat rest portion,
   a single energy transformer for absorbing energy connected to said support structure, and
   connecting means operatively connecting said passenger seat to said energy transformer such that pivotal movement of said back rest portion with respect to said seat rest portion, movement of said seat rest portion with respect to said support structure or both upon collision of said vehicle causes energy absorption by said energy transformer.

2. Apparatus according to claim 1, wherein said connecting means contacts both the seat rest portion and the back rest portion of said passenger seat.

3. Apparatus according to claim 2, wherein said connecting means is arranged to apply a stress to said energy transformer.

4. Apparatus according to claim 3, wherein said stress is a tensile stress.

5. Apparatus according to claim 4, wherein said connecting means includes a flexible pull member attached on one end to said energy transformer and on the other end thereof to said passenger seat.

6. Apparatus according to claim 5, wherein said pull member engages both said back rest portion and said seat rest portion, pivotal movement of said back rest portion with respect to said seat rest portion applying a tensile stress to said pull member.

7. Apparatus according to claim 6, wherein said connecting means includes a flexible pull member attached on one end to said energy transformer and on the other end to said back rest portion, said apparatus further including a bracket attached to said seat rest portion, said pull member freely passing through said bracket.

8. Apparatus according to claim 1, wherein said back rest portion is pivotally mounted on said seat rest portion in such a way that said back rest portion pivotally moves forwardly with respect to said seat rest portion when said seat rest portion moves forwardly upon collision of said vehicle.

9. Apparatus according to claim 1, further comprising a passenger hold-back belt system for holding a passenger in position in said seat.

10. Apparatus according to claim 1, wherein said vehicle is a wheeled, motorized, passenger car.

11. Apparatus according to claim 1, wherein said passenger seat is a child's seat placed on a relatively fixed seat of the vehicle, which fixed seat forms a part of said support structure.

12. Apparatus according to claim 1, wherein said seat is constructed as a child's seat which is placed on a relatively fixed seat of the vehicle, which fixed seat forms part of said support structure which is connected to both said backrest portion and seat rest portion in such a manner that the backrest portion executes a pivotal motion and the seat rest portion executes a linear motion during energy absorption by said energy transformer.

13. Apparatus according to claim 12, wherein the energy absorption means includes a pull member attached to the energy transformer which engages the seat rest portion by way of a pull member direction changing device and which is fastened to said backrest portion on the side of said direction changing device which is opposite said energy transformer.

14. Apparatus according to claim 12, wherein a swingable support is pivotally attached to a front area of said seat rest portion and to a part of said fixed support structure for aiding in guiding the movement of said seat rest portion.

15. Apparatus according to claim 13, wherein said backrest portion is pivotally attached to said seat rest portion.

16. Apparatus according to claim 13, wherein said pull member is fastened near the bottom of said back rest portion.

17. A child's safety passenger seat apparatus for a vehicle of the type having a relatively fixed support structure including a relatively fixed vehicle seat, said apparatus comprising:
   a child's seat having a seat rest portion moveable substantially linearly with respect to said support structure and a back rest portion pivotally moveable forwardly with respect to said seat rest portion when said seat rest portion moves forwardly upon collision of said vehicle,
   a support member attached to a forward part of said seat rest portion and pivotally mounted on said fixed support structure,
   a single energy transformer connected to said fixed support structure for absorbing energy upon stressing thereof,
   a pull member attached on one end to said energy transformer and on the other end to said back rest portion, and
   a reversing device fastened to said seat rest portion, said pull member passing through and engaging said reversing device.

* * * * *